United States Patent Office 3,524,657
Patented Aug. 18, 1970

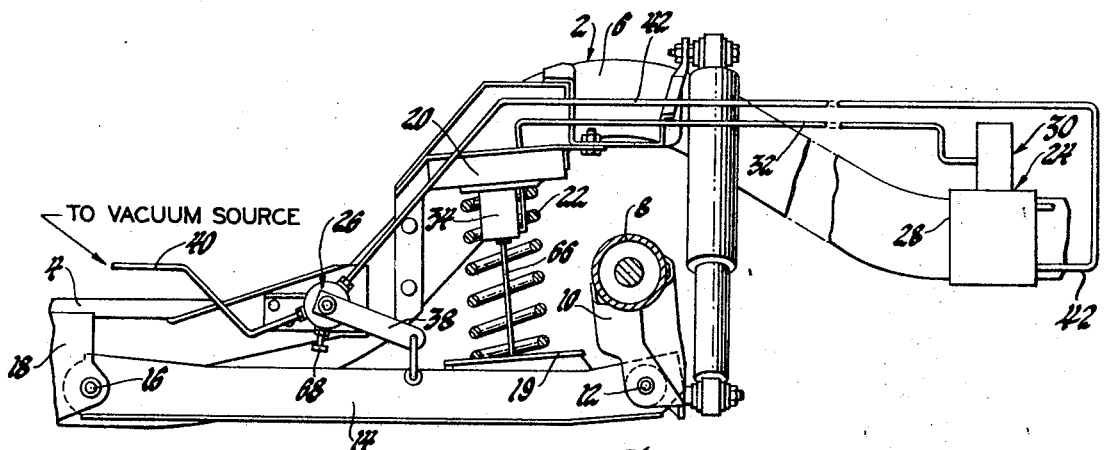

3,524,657
VEHICLE SUSPENSION SYSTEM INCLUDING COMPOSITE SPRING ASSEMBLY
Ming-Chih Yew, Utica, and Bernard J. Finn, Troy, Mich., assignors to General Motors Corporation, Detroit, Mich., a corporation of Delaware
Filed Sept. 27, 1968, Ser. No. 763,220
Int. Cl. B60g 9/00, 11/00
U.S. Cl. 280—124                                8 Claims

ABSTRACT OF THE DISCLOSURE

A composite spring assembly for a vehicle involving a constant rate spring arranged in parallel operating relation with an incompressible fluid displacement device actuated by a vacuum motor disposed exclusively on the sprung mass of the vehicle.

---

This invention relates to composite spring assemblies and more particularly to assemblies of the type including a constant rate spring arranged in parallel relation with a vacuum actuated variable rate spring.

In the past, various proposals have been advanced involving constant rate springs arranged in parallel relation with vacuum energized variable rate springs. Such constructions have included arrangements in which the vacuum spring was arranged so that energization thereof augmented the load supporting capabilities of the constant rate spring as well as arrangements in which the vacuum spring opposed the load supporting capabilities of the constant rate spring. Typical of the former is U.S. 3,003,758 Francis, while the latter is exemplified by U.S. 3,031,204 DeLorean. However, in the past, practical application of vacuum springs either alone or in combination with a constant rate spring has been seriously deterred by the excessive physical size of the spring necessary to fully utilize its capabilities. That is to say, within the limits of vacuum level reasonably available from the vehicle engine, practical utilization of vacuum springs requires space for disposition which, particularly in modern automotive vehicles, is rarely available in the region of normal location of the springs.

The present invention is, therefore, concerned with providing a composite spring including a vacuum actuated variable rate spring in which greatly increased load supporting or load simulating cavabilities may be achieved irrespective of the physical space limitations in the normal locus of the springs. To this end, in contrast to prior art constructions, the vacuum spring is mounted in a convenient location on the sprung mass of the vehicle where space limitations are of minimal concern, such as for example in the vehicle luggage compartment, while an incompressible fluid displacement device located adjacent the constant rate spring is connected by suitable incompressible fluid transmitting means to the vacuum spring, thereby enabling development of any desired spring rate for the variable rate spring even when the sole source of vacuum is unaugmented manifold generated subatmospheric pressure.

An object of the present invention is to provide an improved constant rate-variable rate composite spring assembly.

Another object is to provide an arrangement of the stated character in which the variable rate spring is subatmospheric pressure energized.

A further object is to provide an assembly of the stated character in which the variable rate elastic medium is located exclusively on the sprung mass in a position remote from the points of application thereof between the sprung and unsprung mass.

The foregoing and other objects, advantages and features of the invention will become more readily apparent as reference is had to the accompanying specification and drawing wherein:

FIG. 1 is a partial side elevation, partly in section and with parts broken away, illustrating a suspension structure incorporating a composite spring assembly in accordance with the invention; and FIG. 2 is a view illustrating greatly enlarged fragmentary portions of the assembly shown in FIG. 1.

Referring now to the drawing and particularly FIG. 1, there is shown a suspension structure in which the reference numeral 2 generally designates the frame portion of a vehicle sprung mass. Frame portion 2 includes a longitudinal rail 4 having an arched portion 6 overlying a transversely directed wheel supporting axle housing 8. Axle housing 8 in turn is formed at one lateral end with a depending bracket 10, the lower end of which is pivotally connected at 12 to the trailing end of a suspension control arm 14, the forward end of which in turn is pivotally mounted at 16 on frame side rail bracket 18. It will be understood that like suspension structure is provided at each lateral end of the axle and, therefore, the following description of structure at one side of the vehicle applies equally to the other. Disposed in compression between the lower spring seat 19 of control arm 14 and upper spring seat 20 on side rail 4 is conventional constant rate coil spring 22 which is a preferred embodiment is formed to provide a spring rate which normally supports the portion of the sprung mass adjacent thereto at an elevation such that, when the vehicle sprung mass is occupied by its full normal load complement of passengers, fuel, etc., the entire vehicle exhibits a level attitude, i.e., generally parallel with the ground. Obviously, under such conditions, when the vehicle is unoccupied or occupied with less than a normal load complement, the portion of the sprung mass adjacent spring 22 will be supported at a higher than normal elevation causing the vehicle to exhibit a nose-down attitude.

In order to overcome this condition and maintain the vehicle sprung mass in a level attitude under all conditions of loading up to and including the normal load complement, in accordance with one feature of the invention, the coil spring 22 is arranged to operate in parallel but opposed relation with a vacuum energized variable rate spring assembly 24. Communication between the engine source of vacuum, not shown, and spring 24 is controlled by a height sensing valve 26 arranged so that the vacuum is supplied to the spring until it exerts an elastic force to compress spring 22 sufficiently to enable the sprung mass of a vehicle to achieve a level attitude. Thus, the vacuum spring 24 works in parallel with but in opposition to the coil spring 22 for all load conditions less than normal passenger complement, and hence serves to simulate a load equal to the difference between the actual load on the sprung mass and that which would occur if the full load complement were present.

However, as has been previously noted, due to the relatively modest vacuum available from the engine manifold source, practical utilization of otherwise desirable vacuum springs has been seriously limited because the physical size of such springs necessary to achieve the requisite spring force is generally greater than the space available in the usual spring locale. To overcome this problem in accordance with the present invention, the vacuum motor portion 28 of the vacuum spring assembly 24 is located in a position entirely remote from the coil spring 22, preferably within the forward inner recesses of the luggage compartment, and is connected in axially aligned relation with a first incompressible fluid displacement device 30 which in turn is connected by a fluid conduit 32 in fluid communicating relation with a second incompressible fluid displacement device 34 extending between lower and upper spring seats 14 and 20. In this manner, any desired effective piston area 36 for the vacuum motor may be utilized while enabling utilization of a fluid displacement device 34 of physical dimensions small enough to fit conveniently within the coil spring 22. As will be evident from the drawing, in a preferred embodiment, both incompressible fluid devices 30 and 34 are in the form of single action hydraulic rams of the piston, cylinder and rolling lobe diaphragm type. It will be evident, however, that any known form of hydraulic ram may be utilized with equal efficacy.

In order that the invention may be more clearly understood, a description of operation thereof follows. Assuming that the vehicle is initially unoccupied and the vacuum spring assembly is in an unenergized condition, the coil spring 22 is free to extend to a length supporting the rear portion of the vehicle at a higher than normal level. Under such conditions, the arm 38 of leveling valve 26 will be caused to rotate clockwise downwardly due to the link connection with control arm 14. In this position, leveling valve 26 provides communication between vacuum conduit 40 leading to the vacuum source and vacuum conduit 42 leading to the lower chamber 44 of vacuum motor 28. Creation of subatmospheric pressure within chamber 44 thus accomplished acts on the effective area 36 of piston and diaphragm 46 and 48 urging the former downwardly. Piston rod 50 connected to piston 46 accordingly moves downwardly therewith producing a similar downward displacement of piston 52 in fluid displacement device 30. The downward displacement of piston 52 operating in concert with diaphragm 54 displaces incompressible fluid 56 in chamber 58 causing expulsion thereof through fluid conduit 32 into the lower chamber 60 of incompressible fluid displacement device 34. As fluid enters chamber 60, the pressure thereof acts on piston and diaphragm 62 and 64 urging the former upwardly and causing the piston rod 66 associated therewith to exert an upward force on control arm 14 equal to the elastic force generated by vacuum motor 28. As soon as the vacuum level within chamber 44 has reached a magnitude providing an elastic force sufficient to compress the coil spring 22, the amount necessary to enable the sprung mass to descend to a level attitude, arm 38 of the leveling valve 26 will have been rotated counterclockwise sufficient to interrupt further communication between the source of vacuum and the vacuum motor thereby preventing further descent of the sprung mass. Naturally, as soon as additional load in the form of passengers or cargo is introduced into the vehicle, the aggregate additional weight and simulated load provided by the variable rate spring will cause the sprung mass to descend below the level which would maintain the vehicle in a level attitude. When this occurs, the arm 38 of the leveling valve 26 rotates further counterclockwise and opens the atmosphere port 68 for communication with vacuum conduit 42, thereby allowing admission of atmospheric air into the chamber 44 of the vacuum motor. With the addition of atmospheric air therein, the piston 46 will, of course, move upwardly accompanied by corresponding movement of piston 52. Accordingly, fluid from chamber 60 of displacement device 34 will flow therefrom back into chamber 58 and allow the sprung mass to rise responsive to the supporting force of the constant rate spring 22. As soon as the opposing force of the vacuum spring has been reduced an amount equal to the added load, the arm 38 of the leveling valve will have returned to the neutral position and the sprung mass will be restored to an elevation providing level vehicle attitude.

While the invention has been described and illustrated with the variable rate spring in opposed relation with the constant rate spring, as noted previously, precisely the same combination of elements may be utilized in which the variable rate spring functions to augment the supporting force of the constant rate spring, by merely introducing the incompressible fluid 56 into the upper chamber 70 of device 34 rather than the lower chamber 60 thereof and disposing the atmosphere vent 72 in the lower chamber rather than the upper. Naturally, in such circumstances, the constant rate spring 22 would be initially designed to support the sprung mass of the vehicle in a level attitude when in an unloaded condition, with the variable rate spring functioning to progressively offset additional load up to, or even exceeding the normal load complement.

From the foregoing it will be seen that a novel and improved composite spring assembly has been provided. Of particular significance in the present construction is the fact that the relatively modest level of vacuum available from the vehicle engine no longer constitutes an obstacle to practical application of vacuum energized auxiliary springs. Similarly, space limitations for placement of such springs no longer constitute a deterrent to practical utilization of readily available engine vacuum as a source of energy for the elastic medium.

While but one embodiment of the invention has been shown and described, it will be apparent that other changes and modifications may be made therein. It is, therefore, to be understood that it is not intended to limit the invention to the embodiment shown.

We claim:

1. A composite spring assembly for a vehicle comprising a primary suspension spring disposed between the sprung and unsprung mass of said vehicle, incompressible fluid displacement means arranged in parallel operating relation with said spring, a subatmospheric pressure energized motor mounted exclusively on said sprung mass, and means operated by said motor for transmitting elastic force produced thereby to said incompressible fluid displacement means to provide an auxiliary suspension spring acting in concert with said primary suspension.

2. In a vehicle having a sprung and unsprung mass, a composite spring assembly comprising a constant rate spring disposed between said sprung and unsprung mass and vacuum energized variable rate spring means acting in parallel with said constant rate spring, said variable rate spring means comprising a vacuum motor located remotely from said constant rate spring and an incompressible fluid displacement device disposed between said sprung and unsprung mass and connected in series relation with said vacuum motor.

3. The invention of claim 2 including automatic means for controlling energization of said vacuum motor.

4. The invention of claim 3 wherein said automatic means comprises valve means operated by relative displacement of the sprung and unsprung mass.

5. In a vehicle having a sprung and unsprung mass with spring means disposed therebetween normally supporting the former above the latter at an elevation in excess of a predetermined operational height, vacuum motor means remote from said spring means connected to a source of vacuum by flow regulating valve means operated by relative displacement of said sprung and unsprung mass, first incompressible fluid displacement means arranged in parallel relation with said spring means and interconnecting said sprung and unsprung mass, second incompressible fluid displacement means arranged adjacent to and in series relation with said vacuum motor means, and conduit means providing fluid interconnection between said first and second incompressible fluid displacement means in a manner whereby yieldable displacement of said vacuum motor means by energization thereof from said vacuum source is transmitted to said first incompressible fluid displacement means to provide an elastic force acting in opposition to said spring means effective to displace the sprung mass to said predetermined operational height.

6. The invention of claim 5 wherein said spring means comprises a coil spring.

7. The invention of claim 6 wherein said first incompressible fluid displacement means is disposed concentrically within said coil springs.

8. The invention of claim 7 wherein said second incompressible fluid displacement means is axially aligned with and positively driven by said vacuum motor.

References Cited
UNITED STATES PATENTS

| | | | |
|---|---|---|---|
| 2,896,965 | 7/1959 | Moustakis | 280—124 |
| 3,003,758 | 10/1961 | Francis | 267—34 |
| 3,050,316 | 8/1962 | Behles. | |

A. HARRY LEVY, Primary Examiner

U.S. Cl. X.R.

267—34, 64